April 11, 1950     O. R. SWEENEY ET AL     2,504,053
SOLVENT RECOVERY BY DISTILLATION
Filed Oct. 4, 1946     2 Sheets-Sheet 1
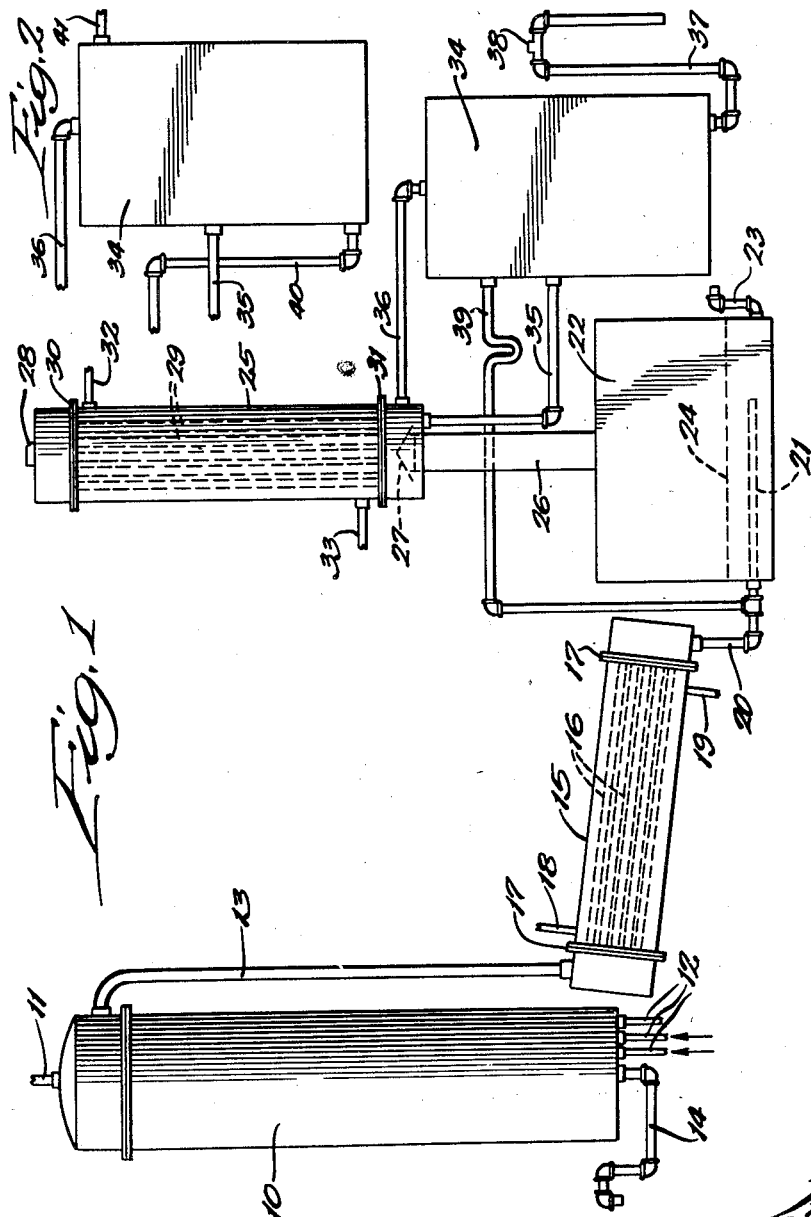
Inventors:
Orland R. Sweeney,
Lionel K. Arnold and
E. Graham Hollowell,
By Dawson, Orth and Spangenberg,
Attorneys.

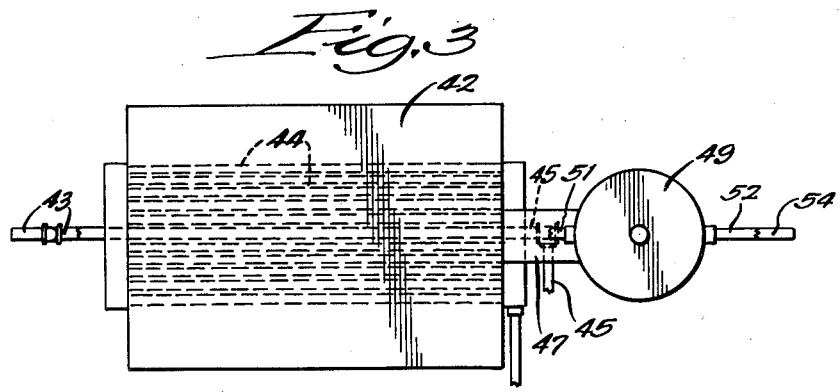
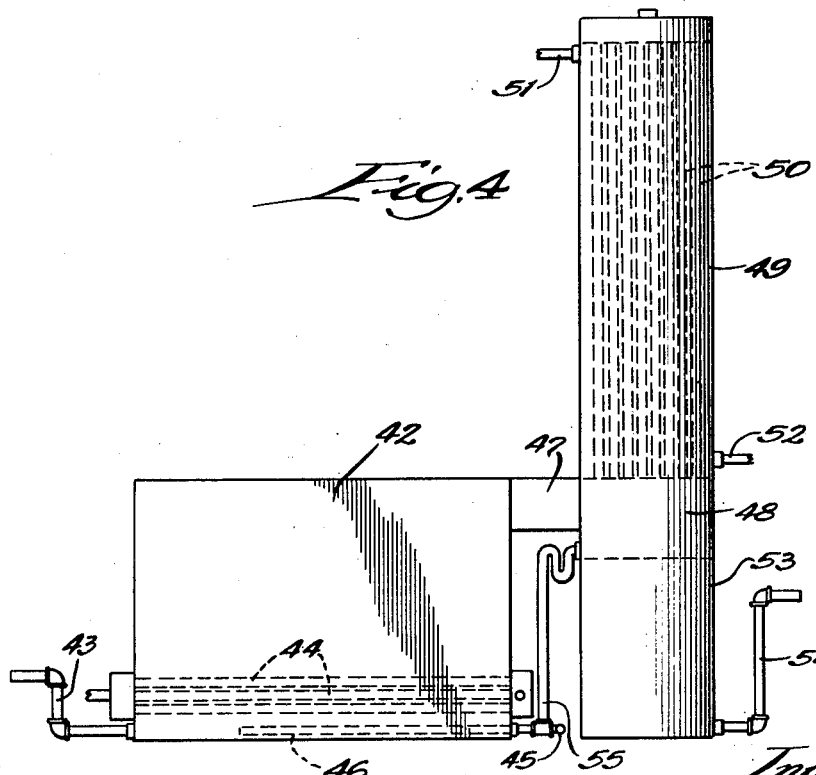

Patented Apr. 11, 1950

2,504,053

UNITED STATES PATENT OFFICE 2,504,053

SOLVENT RECOVERY BY DISTILLATION

Orland R. Sweeney, Lionel K. Arnold, and Eugene Graham Hollowell, Ames, Iowa, assignors to Iowa State College Research Foundation, Ames, Iowa, a corporation of Iowa Application October 4, 1946, Serial No. 701,148

7 Claims. (Cl. 202—71)

This invention relates to the recovery of volatile solvents and the like. It is particularly useful in the recovery of solvents employed in extraction processes and in saving solvent material which might otherwise be lost in emulsion and solvent-saturated water withdrawn from the system.

In the recovery of volatile solvents from mixtures of such solvents and the extracted material, as, for example, oils and fats, it is common practice after the removal of the major portion of the solvent to employ a "stripping" process for the removal of the residual solvent. The stripping process is carried out usually by passing a hot gas or vapor through the heated solution of solvent and extracted material in such a manner as to volatilize the solvent and carry out the solvent vapor and the stripping gas or vapor as a mixture through a common outlet. Various devices have been utilized in this stripping process. For example, in the vegetable oil industry, the solvent-oil mixture or "miscella," as it is usually designated, may be allowed to flow downward through a fractionating column of the bubble cap or sieve plate type, and steam is blown up through the downcoming miscella in a counter-current manner. Another type of stripper consists of a packed column containing any suitable packing material, such as Raschig rings or Beryl saddles.

In addition to the injection of live steam into the stripper, the miscella is commonly heated, either by a preheater prior to entering the stripper or by suitable heating coils, pipes, plates, jackets, or other means built into the stripper itself. The stripper may be operated somewhat above atmospheric pressure, at substantially atmospheric pressure, or below atmospheric pressure. The concentration of the miscella going to the stripper is not critical and may vary between different plants. In the extraction of soy bean oil by means of trichloroethylene, a concentration of approximately 80% oil has been employed; however, this concentration may vary over a considerable range.

The solvent from the miscella vaporizes and passes out with the injected steam from the stripper to a condenser where the vapors are condensed. The condensed solvent and water go to a solvent-water separator where they separate into two layers by gravity.

If only solvent and water vapors pass out of the stripper to the condenser, no difficulty is ordinarily experienced in securing satisfactory separation of the liquid solvent and water in the separator. However, in actual practice, it is very difficult to prevent the vapors from carrying over with them colloidal droplets of oil or liquid products of oil or solvent decomposition occurring from contact with heating media within the stripper. It is obvious also that any volatile products produced by thermal decomposition, fractional distillation, chemical action or interaction of the miscella constituents in the hot stripper, or by other less obvious actions, may also pass over with the solvent and water vapors to the condenser.

The exact nature of such products passing over into the condenser may vary with the kind of oil processed, the solvent used, and the details of the stripper construction and operation. It is known, for example, that most solvents extract some non-fatty constituents, such as coloring matter and phosphatides. The solvents themselves may contain impurities, stabilizers, or coloring matter (added for identification purposes). These constituents of the miscella other than the pure oil or fat and the solvents may be carried over in their original or in modified form as either volatile gases or vapors or as colloidal liquid or solids into the condensers. If the miscella going to the stripper is not completely filtered, finely-divided solids may pass over into the stripper and be entrained with the outgoing vapors.

The above various extraneous materials frequently cause the formation of an emulsion, either in the water or solvent layer. For example, certain oils, such as soy bean oil, contain phosphatides which are excellent emulsifying agents. Colloidal droplets of oil may contain sufficient of the phosphatides to produce stable emulsions when brought into contact with condensing water vapor in a condenser. Under actual operating conditions, the emulsion may be produced in sufficient quantities in a condenser to cause enough fouling and plugging in the tubes within a few hours to prevent carrying out the solvent recovery operation. The emulsion, which is fluid enough to flow from the condenser to the separator, may contain a considerable portion of solvent, either as a part of the emulsion mechanically held in it or in solution in the oil which may form part of the emulsion. These emulsions are frequently very stable and are not readily broken down within a reasonable time by the addition of chemicals in any practical amounts.

In the solvent-water separators, the emulsions will pass out with the overflow water to the sewer, carrying with them considerable amounts of solvent. This loss of solvent with the emulsion is especially undesirable in the case of the more expensive solvents, such as the chlorinated hydrocarbons, trichloroethylene, methylene chloride, and ethylene dichloride. The loss may be sufficient to render an othewise desirable extraction system economically impractical. Further, some of the solvents, such as methylene chloride, have a relatively high solubility in water, and the overflowing of water from the system carries away an undue proportion of this solvent which is otherwise an excellent solvent.

An object of the present invention is to provide a process and apparatus by which the loss of solvents through such emulsions and through such high solubility in water will be effectively prevented in an economical manner. A further object is to provide a method and means whereby the emulsions described may be broken and solvent recovered without substantially increasing the expense of the oil recovery process. Yet another object is to provide a process which will prevent the fouling and plugging of the condenser tubes and which will continuously bring about the withdrawal of water without substantial loss of solvent, the emulsions formed in the process being broken down into their constituents. Yet another object is to provide a process in which the solvent recovery is greater than that secured in a conventional solvent-oil separator operating with water and solvent containing no emulsion. Other specific objects and advantages will appear as the specification proceeds.

The invention is illustrated, in a preferred embodiment, by the accompanying drawings, in which:

Figure 1 is a side view in elevation of apparatus embodying our invention and providing suitable means for the carrying through of our process;

Fig. 2, a separator equipped with different flow lines from those shown in Fig. 1 and adapted for use with a solvent which is lighter than water;

Fig. 3, a broken top plan view of a modified form of apparatus and of more compact arrangement; and Fig. 4, a side view in elevation of the structure shown in Fig. 3.

In the illustration given in Fig. 1 10, designates a stripper of the well-known type already described. Solvent and oil pass through line 11 into the stripper 10. At the bottom of the stripper are three lines leading into the stripper 10. One line carries steam into a coil which heats the stripper, another line serves for the removal of condensate, and the third line is used to introduce steam directly into the stripper itself. Solvent vapors, including steam or water vapors, pass out through line 13 while the stripped oil is recovered through line 14.

For the purpose of clarity, the apparatus shown in Fig. 1 and the process employed therewith will be described in connection with the treating of a specific material, such as, for example, soy bean oil, and the solvents employed will be referred to as those heavier than water, such as, for example, trichloroethylene.

The water and solvent vapors passing through line 13 enter a surface condenser 15 consisting of the usual series of tubes 16 attached to suitable head plates 17, the tubes being surrounded by a water jacket for cooling. Water is introduced through line 19 and withdrawn through pipe 18. Sufficient cooling water or other liquid is introduced through pipe 19 to condense at least a portion of the water vapors, and the hot water and uncondensed vapors flow through line 20 into a perforated pipe 21 lying in the bottom of a boiler or reboiler tank 22. The tank 22 is provided with an overflow pipe 23 having its outlet spaced a distance above the bottom of tank 22 so as to maintain a hot water level 24 within the tank. Preferably, Raschig rings or similar packing material are placed upon the bottom of the tank to a depth sufficient to cover the slotted or perforated pipe 21. Thermometers are preferably placed within the pipe 20 and overflow pipe 23.

Extending a spaced distance above the tank 22 is a vertical condenser 25, preferably placed above the horizontal center of the cylindrical boiler 22. A pipe 26 provides communication between tank 22 and the lower head space of condenser 25, and over the top of the pipe is placed a conical cap 27 of sheet metal to prevent condensing liquid dropping from the condenser tubes from entering the pipe 26. The condenser 25 is provided at its top with a vent pipe 28. The tubes 29 of the condenser connected to the head plates 30 and 31 are surrounded by a water jacket and cooling water or other liquid is supplied to the jacket through pipe 33 and withdrawn through pipe 32.

It will be understood that the condenser 25 as well as the condenser 15 may be modified widely in type and structure. For example, the condenser 15 may be made a vertical condenser rather than a horizontal or inclined condenser, and the condenser 25 may be, if desired, supported in a horizontal or inclined position. In the specific arrangement shown in Fig. 1, the vertical condenser 25 serves as a reflux condenser and enables the reboiler 22 to be operated at a slightly higher temperature than would be desirable if the condenser 25 were in horizontal or inclined position.

A separator 34 is supported at a distance below the vertical condenser 25 and condensate formed within the condenser flows through the conduit 35 to the separator 34 at about its vertical center and preferably discharged into the solvent layer therein. A second conduit 36 connects the top of the separator 34 to the condenser 25 and thus serves as a vent pipe for separator 34. The solvent overflow pipe 37 extends upwardly about two-thirds of the height of the separator and is preferably provided with a vent opening 38 to prevent siphoning.

An overflow pipe 39 entering the separator 34 at a point about three-fourths of the way above the bottom connects the separator to pipe 20, just outside reboiler tank 22.

In the operation of the process and apparatus illustrated in Fig. 1, a mixture consisting principally of solvent and water vapor passes from the stripper to condenser 15 which is operated at such a temperature as to condense a large part of the water vapor and little of the solvent vapor. For example, the cooling water passed into the jacket about tubes 16 is employed in an amount sufficient to maintain the temperature in the reboiler 22 greater than the boiling point of the solvent but less than the boiling point of water. At the relatively high condensing temperatures in condenser 15, practically no emulsion is formed.

The hot mixture of liquid condensed in surface condenser 15, together with vapor, passes through line 20 into the perforated tube 21 within reboiler 22. Here, substantially all of the solvent and part of the water vaporizes and passes through the water layer in the reboiler where they lose part of the entrained liquids, such as oil, and entrained solids, due to the scrubbing and coalescing action of the hot water.

The solvent vapors and uncondensed water vapors pass upwardly through pipe 26 into vertical condenser 25. While the hot water pool within tank 22 removes some oil and entrained solids, sufficient oil and emulsifying agents may be carried into the condenser 25 to cause the formation of an emulsion. The amount of the emulsion formed will be substantially less than would be formed if only one condenser operated in the conventional manner were used. The emulsions and condensed solvent pass through pipe 35 to separator 34 where they stratify into two layers, the solvent on the bottom and the emulsion on the top. When sufficient emulsion has run into the separator 34 to reach a sufficient height, it will flow out through pipe 39 and back to pipe 20 where it is carried into the reboiler 22. Here the emulsion is broken by the heat and the solvent is vaporized out. The hot water containing constituents of the broken down emulsion overflows from tank 22 through line 23.

The vertical condenser 25 is operated with only sufficient cooling water or other liquid to prevent the escape of any solvent vapor. The solvent separated in separator 34 is recovered through the overflow line 37.

The foregoing description has been given in connection with a solvent heavier than water, such as trichloroethylene, methylene chloride, ethylene dichloride, etc. If a solvent lighter than water, such as hexane or benzene, is used, the separator 34 may be readily provided with draw-off pipes which serve the purposes of the invention described in connection with Fig. 1. For example, as illustrated in Fig. 2, the tank 34 may be provided with a return line 40 which carries back emulsion or solvent-saturated water from the bottom of tank 34 to the line 20. The solvent overflow line 41 is placed at the top of tank 34 rather than at the bottom to recover the lighter-than-water solvent.

In the illustration given in Figs. 3 and 4, apparatus similar to that already described but in a more compact form is illustrated. The reboiler 42 is provided with an overflow pipe 43 for maintaining a hot water level within the tank. Cooling within the reboiler is accomplished through tubes 44 connected with suitable headers and through which cold water or other cooling liquid is circulated. Vapors from the stripper consisting of solvent and water vapors, etc., enter the tank 42 through pipe 45 and are discharged within the tank through a perforated pipe 46. Vapors from the tank 42 pass through the pipe 47 into the lower head space 48 of a cylinder 49. Cooling tubes 50 in the upper portion of the cylinder 49 are supplied with cooling water through pipe 52 to provide a vertical condenser for the solvent vapors. The cooling fluid may be withdrawn through pipe 51.

The bottom portion of cylinder 49 provides a separator 53. The separator 53 is provided with an overflow pipe 54 for the recovery of solvent and a return pipe 55 for the return of emulsion or solvent-saturated water, etc., to the line 45 leading into the reboiler 42. The operation of the process within the apparatus shown in Figs. 3 and 4 is substantially the same as that already described in connection with Figs. 1 and 2 and need not be repeated. The process and methods described result in a number of important advantages. Substantially no emulsion is formed in the first condenser, thus eliminating all fouling and inefficient operation due to this cause. The emulsion formed in the second condenser is not produced in a large enough amount nor is it heavy enough to cause any difficulty in the operation of the condenser. The effluent from the apparatus contains no emulsion but merely a colloidal suspension of oil and other unsoluble liquids or solids present in the original emulsion. Without the employment of chemicals or power, the emulsion is effectively broken down and a solvent recovery is obtained that is greater than that secured in a conventional solvent-oil separator operating with water and a solvent containing no emulsion. No additional steam beyond that normally used in stripping the oil is employed. Less cooling water is used than in the conventional methods of condensing the vapors from the stripper. The effluent water and the cooling water from the first condenser leave the apparatus at a temperature not far below the boiling point, thus making heat recovery possible.

In the foregoing description, and for the purpose of clarity, the method has been described in connection with mixtures of water and of solvents of lower boiling points than water. The process and apparatus are obviously applicable to other combinations containing two liquids of different boiling points which are substantially insoluble with each other.

In the foregoing description, it has been assumed that the stripper is operated at atmospheric pressure or at a slight back pressure. If it is desired to operate under reduced pressure, it is only necessary to apply suction by a vacuum pump or other suitable means at the vent opening 28, as illustrated in Fig. 1, and adjust the cooling water to give the correct temperature range for the pressure used, while at the same time employing suitable means for removing the effluent water at 23 and the solvent at 37.

The procedure outlined and the apparatus described above are applicable not only to the recovery of solvent from mixtures of vapors or liquids containing emulsions or emulsion-forming substances but may be advantageously employed for the more complete recovery of solvents whether or not emulsion-forming materials are present. For example, one of the objections to the use of methylene chloride as a solvent is its relatively high solubility in water (about 1.32 grams per 100 grams of water at 25° C.) as compared to other less soluble solvents, as trichloroethylene (about 0.11 gram per 100 grams of water at 25° C.). By utilizing the system described, only a very small amount of the solvent will be lost in the water withdrawn from the system.

Still greater recovery may be secured by conducting all of the vapors from the system (that is, from the miscella concentrators and meal dryers in addition to the stripper) into the first condenser and separating all of the solvent in the separator. If this is not practical, the solvent-saturated water from the solvent water separator attached to the condensers on the dryers and miscella concentrator may be introduced into the system with the stripper vapors entering the first condenser from the stripper, or, if desired, they may be introduced through the pipe leading from the first condenser to the reboiler. The water leaving the overflow line from the reboiler contains only a negligible amount of the solvent, such as methylene chloride, having a high solubility in water.

While in the foregoing specification, we have described the process and apparatus in considerable detail, it will be understood that such details may be varied widely by those skilled in the art without departing from the spirit of our invention.

We claim:

1. A method for recovery of volatile solvents from a vaporized mixture of water, solvent, and emulsion-forming constituents which consists in condensing at least a portion of the vaporized mixture to a liquid state; then passing said mixture of vapors and condensate into a hot water pool; removing the uncondensed vapors from said pool; completely condensing these vapors and passing the resulting liquid mixture of emulsions and solvent to a gravity separator pool, withdrawing the emulsion and returning the same to said hot water pool, and continuously withdrawing water from said hot water pool.

2. A method for recovery of volatile solvents from a vaporized mixture of water, solvent and suspended liquid and solid constituents, which consists in condensing at least a portion of the vaporized mixture to a liquid state, then passing the condensed vapors from said mixture, together with the suspended liquids or solids and with uncondensed water and solvent vapors into a hot water pool; removing the uncondensed vapors from said pool; completely condensing these vapors and passing the mixture of water and suspended material and solvent to a gravity separator pool, withdrawing the water and suspended material and returning the same to said hot water pool, and continuously withdrawing water from said hot water pool.

3. An apparatus for the separation of a volatile solvent from a mixture of solvent vapor and water vapor with entrained oil and emulsifying agent, comprising a condenser, means for cooling the same, a tank equipped with an overflow pipe spaced above the bottom thereof to maintain a liquid body therein, a pipe extending from said condenser and into the tank at a level substantially below the level of said overflow pipe, a second condenser, means for passing vapors from said tank to said second condenser, a separator tank, means for passing the condensate from said second condenser to said separator tank, and means for returning liquid from said separator tank to said pipe.

4. Apparatus for the separation of a volatile solvent from a mixture of solvent vapor and water vapor with entrained oil and emulsifying agent, comprising a condenser, means for cooling the same, a tank equipped with an overflow pipe spaced above the bottom of the tank to maintain a liquid level therein, a pipe leading from said condenser into the bottom portion of said tank substantially below the level of said overflow pipe and having a perforated end portion, a second condenser, means for passing vapors from said tank to said second condenser, means for cooling said second condenser to condense said vapors, a separator tank, means for passing the condensate from said second condenser to said separator tank, and means for returning liquid from a level in said separator tank to said pipe.

5. Apparatus for the separation of a volatile solvent from a mixture of solvent vapor and water vapor with entrained oil and emulsifying agent, comprising a water-cooled surface condenser, a reboiler tank equipped with an overflow pipe spaced above the bottom of the tank, a pipe leading from said condenser into the lower portion of said tank substantially below the level of said overflow pipe and having a perforated end portion, a second water-cooled condenser, means for passing vapors from said tank to said second condenser, a gravity separator tank, means for passing condensate from said second condenser to said separator tank, an overflow pipe connected to said separator for withdrawing liquid near one end of said tank, and an overflow pipe communicating with the other end portion of said tank for returning liquid therefrom to said pipe.

6. Apparatus for the separation of a volatile solvent from a mixture of solvent vapor and water vapor with entrained oil and emulsifying agent, comprising a water-cooled surface condenser of size sufficient for only partial condensation of the mixture of vapors, a horizontal tank, an overflow pipe at one end of said tank, a pipe leading from the outlet end of said surface condenser to said tank and having a horizontal perforated end portion in the bottom of said tank below the liquid level, a vertical condenser above said tank, a vapor conduit leading from the top of said tank to the bottom of said vertical condenser, means for preventing condensate in said vertical condenser from flowing back into said vapor conduit, a separator tank, means for leading condensate from said vertical condenser to said separator tank, and an overflow pipe communicating with one end of said separator tank and with the pipe leading from the first condenser to the said horizontal tank.

7. Apparatus for the separation of a volatile solvent from a mixture of solvent vapor and water vapor with entrained oil and emulsifying agent, comprising a horizontal tank equipped with cooling coils near the bottom, an inlet pipe for introducing fluid into said tank, said pipe being located near the bottom and having a horizontal perforated end portion on the inside of said tank, an outlet pipe at the opposite end of the tank from the inlet pipe, a vertical cylindrical tank with cooling coils in the upper part, a vapor conduit leading from the upper part of the horizontal tank to the inside of the vertical tank just below the cooling coils of the latter, an overflow pipe from the vertical tank to the inlet pipe on the horizontal tank, and an overflow pipe from the lower section of the vertical tank.

ORLAND R. SWEENEY.
LIONEL K. ARNOLD.
E. GRAHAM HOLLOWELL.

REFERENCES CITED

The following references are of record in the file of this patent:

UNITED STATES PATENTS

| Number | Name | Date |
|---|---|---|
| 1,191,916 | Brooks et al. | July 18, 1916 |
| 1,921,157 | Heath et al. | Aug. 8, 1933 |
| 1,950,558 | Karrick | Mar. 13, 1934 |
| 2,104,401 | Murphee et al. | Jan. 4, 1938 |

OTHER REFERENCES

Perry, "Chemical Engineers Handbook" 2nd edition, McGraw-Hill 1941, pages 1444-1448.